United States Patent Office 3,165,520
Patented Jan. 12, 1965

3,165,520
PYRAZOLO-PYRIMIDINES
Paul Schmidt, Therwil, and Kurt Eichenberger and Max Wilhelm, Basel, Switzerland, assignors to Ciba Corporation, a corporation of Delaware
No Drawing. Filed May 5, 1961, Ser. No. 107,908
Claims priority, application Switzerland, May 11, 1960, 5,403/60; Apr. 4, 1961, 3,929/61
18 Claims. (Cl. 260—256.4)

This invention provides pyrazolo-[3,4-d]-pyrimidines of the formula

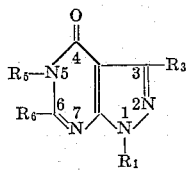

and quaternary ammonium compounds or salts thereof. In the above formula $R_1$ represents a hydrogen atom or an alkyl, hydroxyalkyl, halogen-alkyl or oxa-alkyl radical or a cycloalkyl, cycloalkyl-alkyl, aralkyl or heterocyclylalkyl radical or an at most binuclear aryl or heterocyclic radical. $R_1$ may represent, for example, a lower alkyl radical such as a methyl, ethyl, propyl, isopropyl, butyl, isobutyl, pentyl-(1), pentyl-(2)-pentyl-(3)-, 2-methyl-butyl-(3)- or hexyl radical, a 3-oxa-pentyl or 5-oxa-heptyl-(2) radical, or a hydroxy- or halogen-lower-alkyl radical, such as a hydroxyethyl or chlorethyl radical, a cyclopentyl or cyclohexyl radical, cyclopentyl- or cyclohexyl-methyl, -ethyl or -propyl radical, or phenylalkyl, such as phenyl-lower alkyl e.g. 1- or 2-phenylethyl or phenylmethyl, or phenyl radical, in which the aromatic nuclei may be substituted, for example, by lower alkyl or free or substituted hydroxy, amino or mercapto groups, halogen atoms, trifluoromethyl or nitro groups, or mononuclear heterocyclic or heterocyclyl-alkyl radicals, such as pyridyl, thienyl, furyl, pyridylmethyl, thenyl or furfuryl radicals, which may be similarly substituted. The aforesaid substituted hydroxy, mercapto or amino groups may contain substituents of the kind referred to above, and especially lower alkyl radicals, for example, methoxy, ethoxy, propoxy or butoxy groups or corresponding alkylmercapto or mono- or di-alkylamino groups or alkylene-dioxy, such as methylene-dioxy, groups. As halogen atoms there may be mentioned, more especially, fluorine, chlorine or bromine.

$R_3$ represents a lower alkyl radical, for example, one of those mentioned for $R_1$, especially methyl, but $R_3$ preferably represents a hydrogen atom.

$R_5$ represents an aliphatic, cycloaliphatic, cyclo-aliphatic-aliphatic, araliphatic or heterocyclic-aliphatic radical. There may be mentioned more especially a lower branched or straight alkyl radical bound in any position, such as a methyl, ethyl, propyl, isopropyl, butyl, pentyl-(1), pentyl-(2), pentyl-(3), 2-methyl-butyl-(3)- or hexyl radical; a cycloalkyl-alkyl radical, such as a cyclopentyl- or cyclohexyl-methyl, -ethyl or -propyl radical; an oxaalkyl radical such as 3-oxa-pentyl or 5-oxa-heptyl-(2); an hydroxy- or halogen-alkyl radical, such as an hydroxy- or chlorethyl or -propyl radical; more especially an amino- or ammonium-alkyl radical, for example, one in which the amino or ammonium group is substituted by a hydrocarbon radical, especially a lower alkyl or alkylene radical, which radical may be mono- or advantageously di- or tri-substituted and in which hydrocarbon radical the carbon chain may be interrupted by oxygen, sulfur or nitrogen. There may be mentioned, more especially, dimethylamino-, diethylamino-, pyrrolidino-, piperidino-, morpholino-, piperazino-, N-methyl-piperazino-ethyl, -propyl or -butyl radicals. As araliphatic or heterocyclyl-aliphatic radicals there may be mentioned more especially those named for $R_1$.

$R_6$ represents an aliphatic radical or an aralkyl or heterocyclyl-alkyl radical which may be substituted. $R_6$, may be, for example, a lower alkyl radical, such as a methyl or ethyl radical or a radical containing more than two carbon atoms, such as a propyl, isopropyl, butyl, isobutyl, pentyl-(1), pentyl-(2), pentyl-(3), 2-methyl-butyl-(3) or hexyl radical, but especially a phenyl-alkyl, such as a phenyl-lower alkyl e.g. 1- or 2-phenyl-ethyl, 1-phenylpropyl or phenyl-methyl radical, in which the aromatic nucleus may contain substituents, such as lower alkyl or free or substituted hydroxy, amino or mercapto groups, halogen atoms, trifluoromethyl or nitro groups, or mononuclear heterocyclyl-alkyl radicals, which may be similarly substituted, such as pyridylmethyl, thenyl or furfuryl radicals. The alkyl radicals are, for example, methyl, ethyl, propyl or butyl and may be substituted, for example, by a further aryl or heterocyclic radical, as in the case of the diphenyl-methyl radical. Substituted hydroxy, mercapto or amino groups bound to the phenyl radicals are above all lower alkoxy groups, such as methoxy, ethoxy, propoxy, butoxy, methylene-dioxy, methylmercapto or dimethylamino groups. As halogen atoms there may be mentioned above all chlorine and bromine.

The new compounds of this invention possess valuable pharmacological properties, they possess more especially a coronary dilating action. The new compounds are, therefore, useful as medicaments, more especially in circulatory disturbances in the myocardium, and they are useful as intermediate products for making such medicaments.

Especially valuable as coronary dilating agents are compounds of the formula

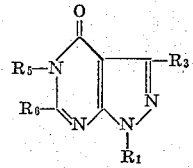

and salts thereof, in which formula $R_1$ represents a hydrogen atom or a lower alkyl radical, for example, methyl, ethyl, propyl, isopropyl, butyl-(2), 3-methyl-butyl-(2), pentyl-(2) or pentyl-(3); or a cycloalkyl radical such as, cyclo-pentyl or cyclohexyl, an hydroxy-lower-alkyl radical, such as hydroxyethyl or halogen-lower-alkyl radical, such as chlorethyl, an oxa-lower-alkyl such as 3-oxapentyl radical; or an aryl radical, such as a phenyl radical in which the aryl radical may be unsubstituted or mono-, di- or tri-substituted by halogen, such as chlorine or bromine, an alkoxy such as methoxy, or ethoxy, alkyl such as a methyl, ethyl, propyl, isopropyl, butyl, tertiary-butyl or methylene-dioxy, or trifluoromethyl, nitro or amino, or a pyridyl radical; $R_3$ represents a hydrogen atom or a lower alkyl radical; $R_5$ represents a lower alkyl-radical, for example, one of those mentioned above, or a lower aminoalkyl, especially a tertiary-amino-lower alkyl radical, especially one of those mentioned above; and $R_6$ represents a lower alkyl radical, for example, one of those mentioned above or an aralkyl radical, such as a phenylalkyl, especially a phenylmethyl, radical in which the aryl radical may be substituted in the manner indicated above. Especially valuable are compounds of the formula

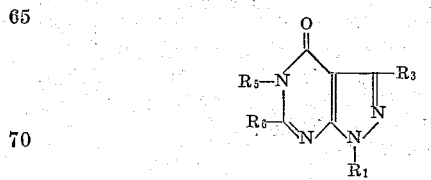

and salts thereof, in which formula $R_1$ represents a hydrogen atom or preferably a lower alkyl radical, especially a branched alkyl radical, such as an isopropyl or secondary-butyl radical, $R_3$ represents a lower alkyl radical or preferably a hydrogen atom, $R_5$ represents a di-lower-alkylamino-, pyrrolodino-, piperidino-, morpholino- or piperazino-lower-alkyl radical, and especially a dimethylamino- or diethylamino-ethyl or propyl radical, and $R_6$ represents an unsubstituted or mono-, di- or tri-substituted benzyl radical substituted in the phenyl radical by chlorine, methoxy, methylene-dioxy, methyl or trifluoromethyl.

Especially valuable is 1-secondary-butyl-5-($\beta$-diethyl-aminoethyl)-6-benzyl-4-oxo-4:5 - dihydropyrazolo - (3,4-d)-pyrimidine of the formula

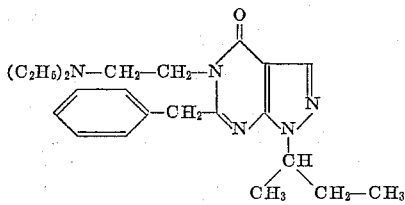

and salts thereof.

The invention also provides a process for the manufacture of the above new compounds, wherein the tautomerisable hydrogen atom present in a 1-$R_1$-3-$R_3$-4-oxo-4:5-dihydro-6-$R_6$-pyrazolo-[3,4-d]-pyrimidine is exchanged by a method in itself known for the radical $R_5$, the symbols $R_1$, $R_3$, $R_5$ and $R_6$ having the meaning given above. Preferably this is brought about by treating the pyrimidine compound with a reactive ester of an alcohol of the formula $R_5OH$. As reactive esters there may be mentioned those of strong inorganic or organic acids, for example, hydrohalic acids, sulfuric acid or organic sulfuric acids, for example, aryl sulfonic acids such as toluene sulfonic acids, and as alcohols there may be mentioned more especially lower alkanols, alkoxyalkanols or amino-alkanols substituted, for example, in the manner indicated above. The reaction is carried out in the usual manner, in the presence of a basic condensing agent, such as an alkali metal hydroxide, alcoholate, hydride or amide.

The tertiary amines so obtained can be quaternated in the usual manner, for example, with reactive esters of alcohols, such as alkanols or phenyl-alkanols. In the compounds so obtained substituents may be introduced or exchanged. Thus, for example, aryl radicals may be nitrated, and nitro-aryl radicals reduced in the usual manner to amino-aryl radicals, or hydroxy alkyl or halogen-alkyl radicals, for example, in the 5-position, may be converted in known manner into amino-alkyl or ammonium-alkyl radicals. The hydroxy-alkyl and halogen-alkyl radicals may be converted, for example, in the usual manner by reacting a hydroxy-alkyl or halogen-alkyl group, in the case of a hydroxy-alkyl group after converting it into a reactive ester, with ammonia or an amine.

The products so obtained of basic character form salts with inorganic or organic acids. As acid forming salts there are used, therapeutically useful acids, for example, hydrohalic acids, sulfuric acids, phosphoric acids, nitric acid or perchloric acid; aliphatic, alicyclic aromatic or heterocyclic carboxylic or sulfonic acids, such as formic, acetic, propionic, oxalic, succinic, glycollic, lactic, malic, tartaric, citric, ascorbic, hydroxymaleic, dihydroxymaleic or pyroracemic acid; phenyl-acetic, benzoic, para-amino-benzoic, anthranilic, para-hydroxy benzoic, salicylic or para-aminosalicylic acid, methane sulfonic acid, ethane sulfonic acid, hydroxy-ethane sulfonic acid or ethylene-sulfonic acid; toluene sulfonic acids, naphthalene sulfonic acids or sulphanilic acid; methionine, tryptophane, lysine, arginine, cysteine or glutamic acid. Salts so obtained may be converted into the free bases, and the free bases may be converted into salts thereof.

The new pharmacologically useful compounds, their salts or corresponding mixtures can be used, for example, in the form of pharmaceutical preparations. These preparations contain the said compounds in admixture with a pharmaceutical organic or inorganic carrier suitable for enteral or parenteral administration. As carriers there are used substances that do not react with the new compounds, for example, gelatine, lactose, starches, magnesium stearate, talc, vegetable oils, water, benzyl alcohols, gums, polyalkylene glycols, cholesterol or other known carrier for medicaments. The pharmaceutical preparations may be used, for example, in the form of tablets, dragées or in liquid form, such as solutions, suspensions or emulsions. If desired they may be sterilized and may contain auxiliary substances, such as preserving, stabilising, wetting or emulsifying agents. They may also contain therapeutically useful substances. The preparations are made up by the usual methods. They contain, for example, 1–100 mg., and advantageously 5–50 mg., of the active substance per dosage unit, and about 1 to 70%, advantageously 5 to 50% of active substance.

When there are used in the process of the invention starting materials that are new they can be made by methods in themselves known or described herein.

As starting materials there are advantageously used in the process those which lead to the especially valuable final products hereinbefore mentioned. The starting materials may also be used in the form of quaternary ammonium compounds or salts thereof. The 1-$R_1$-3-$R_3$-4-hydroxy-6-$R_6$-pyrazolo-[3,4-d]-pyrimidines used as starting materials can be obtained by the process described in our copending application Serial No. 107,906, filed May 5, 1961, by reacting 2-$R_1$-3-amino-4-carbethoxy-pyrazole with a nitrile of the formula $R_6$—CN with the use of sodium as condensing agent. In addition to the starting materials used in the examples described below there may be used the following starting materials:

1 - methyl - 4 - hydroxy - 6 - (3':4':5' - trimethoxy-phenyl-methyl)-pyrazolo-[3,4-d]-pyrimidine, melting at 245° C.;

1 - isopropyl - 4 - hydroxy - 6 - (3':4':5' - trimethoxy-phenyl-methyl)-pyrazolo-[3,4-d]-pyrimidine, melting at 195–196° C.;

1 - isopropyl - 4 - hydroxy - 6 - para - ethoxybenzyl-pyrazolo-[3,4-d]-pyrimidine, melting at 175–176° C.;

1 - cyclohexyl - 4 - hydroxy - 6 - benzyl - pyrazolo - [3,4-d]-pyrimidine, melting at 207–208° C.;

1 - (3' - penyl) - 4 - hydroxy - 6 - benzyl - pyrazolo - [3,4-d]-pyrimidine, melting at 144–145° C.;

1 - cyclo - pentyl - 4 - hydroxy - 6 - benzyl - pyrazolo-[3,4-d]-pyrimidine, melting at 189–190° C.;

1 - ($\beta$ - hydroxy - ethyl) - 4 - hydroxy - 6 - benzyl-pyrazolo-[3,4-d]-pyrimidine, melting at 194–195° C.;

1 - isopropyl - 4 - hydroxy - 6 - para - chlorbenzyl-pyrazolo-[3,4-d]-pyrimidine, melting at 181–182° C.;

1 - isopropyl - 4 - hydroxy - 6 - m - methoxy - benzyl-pyrazolo-[3,4-d]-pyrimidine, melting at 155–158° C.;

1 - isopropyl - 4 - hydroxy - 6 - ethyl - pyrazolo - [3,4 - d]-pyrimidine, melting at 180–182° C.;

1 - [1' - ethoxy - butyl - (3')] - 4 - hydroxy - 6 - benzyl-pyrazolo-[3,4-d]-pyrimidine, melting at 111–112° C.;

1 - methyl - 4 - hydroxy - 6 - para - chlorbenzyl - pyrazolo-[3,4-d]-pyrimidine, melting at 268–270° C.;

1-methyl-4-hydroxy-6-(2':3'-dimethoxy-phenyl-methyl)-pyrazolo-[3,4-d]-pyrimidine, melting at 190–191° C.;

1-phenyl-4-hydroxy-6-m-methoxybenzyl-pyrazolo-[3,4-d]-pyramidine, melting at 235° C.;

1-$\alpha$-pyridyl-4-hydroxy-6-benzyl-pyrazolo-[3,4-d]-pyrimidine, melting at 360° C.;

4-hydroxy-6-benzyl-pyrazolo-[3,4-d]-pyrimidine, melting at 290–292° C.;

1-isopropyl-4-hydroxy-6-(2'-methyl-propyl)-pyrazolo-[3,4-d]-pyrimidine, melting at 114–116° C.;

1-isopropyl-4-hydroxy-6-ortho-methoxy-benzyl-pyrazolo-[3,4-d]-pyrimidine, melting at 157–159° C.;

1-isopropyl-4-hydroxy-6-(2'-methyl-3'-methoxy-phenyl-
methyl)-pyrazolo-[3,4-d]-pyrimidine, melting at
150–151° C.;
1-[3'-methyl-butyl-(2')]-4-hydroxy-6-benzyl-pyrazolo-
[3,4-d]-pyrimidine, melting at 157–158° C.;
1-isopropyl-4-hydroxy-6-para-nitrobenzyl-pyrazolo-
[3,4-d]-pyrimidine, melting at 196–198° C.;
1-isopropyl-4-hydroxy-6-para-aminobenzyl-pyrazolo-
[3,4-d]-pyrimidine, melting at 211–212° C.;
1-sec.-butyl-4-hydroxy-6-isopropyl-pyrazolo-[3:4-d]-
pyrimidine, melting at 146–148° C.;
1-sec.-butyl-4-hydroxy-6-(2'-methyl-propyl)-pyrazolo-
[3:4-d]-pyrimidine, melting at 115–116° C.

The following examples illustrate the invention. In the examples the method of representing the structure of the pyrazolo-[3:4-d]-pyrimidines used as starting material has been chosen which shows the greatest number of nuclear double bonds.

Example 1

1.95 cc. of dimethyl sulfate are added to a solution of 5.4 grams of 1-isopropyl-4-hydroxy-6-benzylpyrazole-[3:4-d]-pyrimidine in 30 cc. of 1 N-sodium hydroxide solution and the mixture is stirred for 1 hour at room temperature. The alkaline solution is thereupon extracted with ether and the ether residue is crystallized from petroleum ether. In this way, 1-isopropyl-5-methyl-6-benzyl-4-oxo-4:5-dihydropyrazolo-[3:4-d] - pyrimidine is obtained in colorless crystals having a melting point of 96–97° C.

The starting material is obtained in the following manner:

2.3 grams of sodium are finely crushed in 50 cc. of benzyl cyanide and 9.9 grams of 2-isopropyl-3-amino-4-carbethoxy-pyrazole are added. The mixture is then heated for 4 hours while stirring to 110–120° C., 100 cc. of alcohol are added after cooling, and evaporation to dryness is carried out in vacuo. The residue is absorbed in 150 cc. of 2 N-sodium hydroxide solution, the alkaline solution is shaken with chloroform to separate any undissolved material and is then adjusted to pH=5–6 with 6 N-hydrochloric acid, a solid product being precipitated. The latter is recrystallised from a little alcohol. In this way, 1-isopropyl-4-hydroxy- 6 - benzyl-pyrazolo-[3:4-d]-pyrimidine of the formula

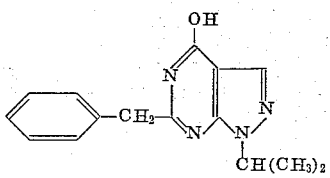

is obtained in colorless crystals having a melting point of 165–166° C.

Example 2

A solution of 1.15 grams of sodium in 40 cc. of absolute alcohol is added to 14.1 grams of 1 sec. butyl-4-hydroxy-6-benzylpyrazolo-[3:4-d]-pyrimidine in 60 cc. of absolute alcohol and the mixture is boiled for 4 hours under reflux after adding 7.5 grams of diethylaminoethyl chloride. After cooling, the precipitated crystals are filtered off with suction, the filtrate is concentrated, 50 cc. of 1 N-hydrochloric acid are added to the residue and a little undissolved material is filtered off. The filtrate is adjusted to pH value of 10 with 2 N-sodium hydroxide solution and extracted with ether. The oil obtained from the other residue is dissolved in 30 cc. of absolute alcohol and 28.4 cc. of 1.49 N-alcoholic hydrochloric acid are added to the solution. 1-sec.-butyl-5-(β-diethylaminoethyl)-6-benzyl-4-oxo-4:5-dihydropyrazolo - [3:4-d] - pyrimidine is obtained as residue from the concentrated reaction solution in the form of the hydrochloride, which has a melting point of 147–148° C.

The 1-sec.-butyl-4-hydroxy-6-benzylpyrazolo - [3:4-d]-pyrimidine employed as starting material can be obtained as follows:

13.8 grams of sodium are added in small pieces to 200 cc. of benzyl cyanide and then 63.3 grams of 2-sec.-butyl-3-amino-4-carbethoxy-pyrazole are added. The mixture is heated to 110–120° C. in about 30 minutes and stirring is then continued for a further 5 hours at this temperature. After the mixture has cooled, absolute alcohol is added thereto and it is concentrated in vacuo. Dilute sodium hydroxide solution is added to the residue and the solution is extracted with chloroform. The aqueous alkaline solution is treated with active carbon and filtered. The clear filtrate is adjusted to a pH value of 6 with 5 N-hydrochloric acid, whereupon 1-sec.-butyl-4-hydroxy-6-benzyl-pyrazolo-[3:4-d]-pyrimidine of the formula

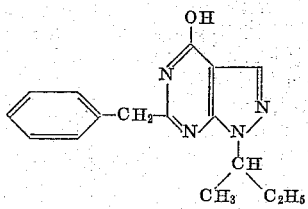

is precipitated, which after recrystallisation from alcohol, melts at 154–155° C.

Example 3

13.4 grams of 1-isopropyl-4-hydroxy-6-benzyl-pyrazolo-[3:4-d]-pyrimidine are added to a sodium ethylate solution, prepared from 1.2 grams of sodium and 300 cc. of alcohol free from water. To form the sodium salt, stirring is carried out for 1 hour at room temperature. 5.5 grams of β-dimethylaminoethyl chloride are added, the mixture is heated for 4 hours to boiling point and then evaporated to dryness in vacuo, the residue is dissolved in 100 cc. of 1-N-hydrochloric acid, the solution is adjusted to a pH value of 10 with sodium hydroxide solution and the precipitated oil is absorbed in ether. The ether residue is recrystallized from petroleum ether. In this way, 1-isopropyl-5-(β-dimethylaminoethyl)-6-benzyl-4-oxo - 4:5 - dihydropyrazolo-[3:4-d]-pyrimidine is obtained in colorless crystals having a melting point from 115–117° C. The hydrochloride melts from 229–231° C.

Example 4

13.4 grams of 1-isopropyl-4-hydroxy-6-benzylpyrazolo-[3:4-d]-pyrimidine are added to a sodium ethylate solution, prepared from 1.2 grams of sodium and 300 cc. of alcohol free from water. To form the sodium salt, stirring is carried out for 1 hour at room temperature. 7 grams of β-diethylaminoethyl chloride are added, mixture is heated for 4 hours to boiling point and then evaporated to dryness in vacuo, the residue is dissolved in 100 cc. of 1 N-hydrochloric acid, the solution is adjusted to a pH value of 10 with sodium hydroxide solution and the precipitated oil is absorbed in ether. Alcoholic hydrochloric acid is added to the ether residue. This is evaporated and the residue is recrystallized from ethyl acetate. In this way, the hydrochloride of 1-isopropyl-5-(β-diethylaminoethyl)-6-benzyl - 4 - oxo - 4:5-dihydropyrazolo-[3,4-d]-pyrimidine is obtained in colorless crystals having a melting point of 202–203° C.

Example 5

13.4 grams of 1 isopropyl-4-hydroxy-6-benzyl-pyrazolo-[3,4-d]-pyrimidine are added to a sodium ethylate solution, prepared from 1.2 grams of sodium and 300 cc. of alcohol free from water. To form the sodium salt, stirring is carried out for 1 hour at room temperature. 8 grams of γ-diethylaminopropyl chloride are then added, the mixture is heated for 4 hours to boiling point and then evaporated to dryness in vacuo, the residue is dissolved in 100 cc. of 1 N-hydrochloric acid, the solution is adjusted to a pH value of 10 with sodium hydroxide solution and the precipitate oil is absorbed in ether. The ether residue is recrystallized from petroleum ether. In this way, 1-isopropyl-5-(γ-diethylaminopropyl)-6-benzyl-4-oxo-4:5-dihydropyrazolo-[3:4-d]-pyrimidine is obtained in colorless crystals having a melting point of 70–71° C. The hydrochloride melts from 173–175° C.

*Example 6*

1.2 grams of sodium in 25 cc. of ethanol are added to 12 grams of 1-methyl-4-hydroxy-6-benzyl-pyrazolo-[3:4-d]-pyrimidine in 75 cc. of alcohol. The mixture is boiled for 1 hour under reflux and 6 grams of β-diethylaminoethyl-chloride are thereupon added, whereupon heating is carried out for a further 3 hours to boiling point. The sodium chloride precipitated is filtered off, the filtrate is concentrated and the residue is crystallized from cyclohexane. 1 - methyl - 5 - (β - diethylaminoethyl)-6-benzyl-4-oxo-4:5-dihydro-pyrazolo - [3:4-d] - pyrimidine is obtained in crystals having a melting point of 83–85° C. The hydrochloride melts at 219° C.

The 1-methyl-4-hydroxy-6-benzyl-pyrazolo-[3 : 4-d]-pyrimidine employed as starting material can be obtained as follows:

2.3 grams of sodium are added in small pieces to a solution of 8.5 grams of 2-methyl-3-amino-4-carbethoxy-pyrazole in 50 cc. of benzyl cyanide and the mixture is the heated to 110–120° C. while stirring. After 4 hours the reaction mixture is cooled and 100 cc. of ethanol are added thereto. The solution is evaporated to dryness in vacuo. 150 cc. of 2 N-sodium-hydroxide solution are added to the residue and the excess benzyl cyanide is extracted with chloroform. The aqueous phase is adjusted to a pH value of 5–6 by adding 5 N-hydrochloric acid, a solid deposit being precipitated which is filtered off and recrystallized several times from ethanol. 1-methyl-4-hydroxy-6 - benzyl-pyrazolo-[3:4-d]-pyrimidine of the formula

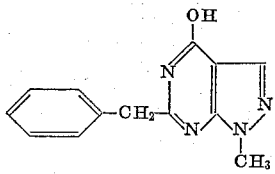

is obtained in crystals having a melting point of 236–237° C.

*Example 7*

A solution of 800 mg. of sodium in 10 cc. of ethanol is added to a suspension of 10 grams of 1-phenyl-6-benzyl-4-hydroxypyrazolo-[3:4-d]-pyrimidine in 100 cc. of ethanol and the mixture is boiled for 30 minutes under reflux. 5 grams of β-diethylaminoethyl-chloride in 10 cc. of alcohol are thereupon added and boiling is continued for a further 3 hours. The sodium chloride precipitated is filtered off and the filtrate is evaporated to dryness in vacuo. The solid residue is recrystallized from cyclohexane-petroleum ether and in this way 1-phenyl-5-(β-diethylaminoethyl) - 6 - benzyl-4-oxo-4:5-dihydropyrazolo-[3:4-d]-pyrimidine is obtained in crystals having a melting point of 103–105° C. The hydrochloride melts at 225° C.

The 1-phenyl-6-benzyl-4-hydroxy-pyrazolo - [3:4-d]-pyrimidine employed as starting material is obtained as follows:

2.3 grams of sodium are added in small pieces to a mixture of 12 grams of 2-phenyl-3-amino-4-carbethoxy-pyrazolo and 50 grams of benzyl-cyanide and the mixture is heated for 4 hours to 140° C. while stirring. After cooling 100 cc. of alcohol are mixed with the reaction mixture and 2 N-hydrochloric acid is added until a pH value of 5–6 is reached. A deposit is precipitated and is recrystallized from chloroform petroleum ether. In this way 1-phenyl-4-hydroxy-6-benzylpyrazolo-[3:4-d]-pyrimidine of the formula

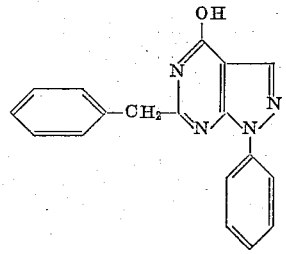

is obtained in colorless crystals having a melting point of 264–265° C.

*Example 8*

9.1 grams of 1-isopropyl-4-hydroxy-6-methyl-pyrazolo-[3:4-d]-pyrimidine are added to a sodium ethylate solution prepared from 1.2 grams of sodium and 150 cc. of ethanol free from water. To form the sodium salt, stirring is carried out for 1 hour at room temperature. 7 grams of β-diethylaminoethyl chloride are added, the mixture is heated for 4 hours to boiling point and then evaporated to dryness in vacuo, the residue is dissolved in 100 cc. of 1 N-hydrochloric acid, the solution is adjusted to a pH value of 10 with sodium hydroxide solution and the precipitated oil is absorbed in ether. Alcoholic hydrochloric acid is added to the ether residue. The solvent evaporated and the residue is recrystallized from ethyl acetate. In this way, the hydrochloride of 1-isopropyl-5-(β-di-ethylaminoethyl)-6-methyl - 4 - oxo-4:5-dihydropyrazolo-[3:4-d]-pyrimidine is obtained.

The 1-isopropyl-4-hydroxy-6-methyl-pyrazolo-[3:4-d]-pyrimidine employed as starting material is obtained as follows:

2.3 grams of sodium are added to a solution of 9.9 grams of 2-isopropyl-3-amino-4-carbethoxy-pyrazole in 50 cc. of acetonitrile while carrying out cooling with ice. During the reaction, the temperature must not rise above 30° C. As soon as the exothermic reaction is terminated, heating is carried out for 4 hours to 90–95° C. The reaction mixture is then cooled and 100 cc. of ethanol are added. The mixture is evaporated to dryness in vacuo, 150 cc. of 2 N-sodium hydroxide solution is added to the residue and the excess acetonitrile is extracted with chloroform. The aqueous phase is adjusted to a pH value of 3–4 by adding 5 N-hydrochloric acid and, after standing for some time, a solid precipitate is deposited and is filtered off and recrystallized from ethanol. 1 - isopropyl - 4 - hydroxy - 6 - methylpyrazolo-[3:4-d]-pyrimidine of the formula

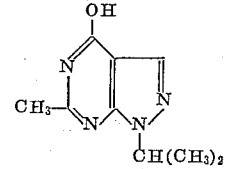

is obtained in white crystals having a melting point of 195–196° C.

*Example 9*

6.3 grams of dimethyl sulfate are added to a solution of 11 grams of 1:6-diisopropyl-4-hydroxy-pyrazolo-[3:4-d]-pyrimidine in 75 cc. of 2 N-sodium hydroxide solution and stirring is carried out for 2 hours at room temperature and the mixture is allowed to stand overnight. The deposited precipitate is thereupon filtered off with suction and crystallized from petroleum ether. In this way, 1:6 - diisopropyl - 5 - methyl - 4 - oxo - 4:5-dihydro-pyrazolo-[3:4-d]-pyrimidine is obtained in colorless crystals having a melting point of 75–77° C.

The 1:6 - diisopropyl - 4 - hydroxy - pyrazolo - [3:4-d]-pyrimidine employed as starting material is obtained as follows:

39.6 grams of 2-isopropyl-3-amino-4-carbethoxy-pyrazole and 9.2 grams of sodium in a finely crushed state are added to 160 cc. of isobutyronitrile. The mixture is heated to 110° C. within 1 hour and this temperature is maintained for 4 hours while stirring. After cooling, 15 cc. of ethanol are added, the mixture is evaporated to dryness in vacuo, the residue is absorbed in 100 cc. of 2 N-sodium hydroxide solution and the alkaline solution is extracted with chloroform. The aqueous phase is adjusted to a pH value of 5–6 by adding 5 N-hydrochloric acid, a solid product being precipitated. The latter is recrystallized several times from ethanol. In this way, 1 - isopropyl - 4 - hydroxy - 6 - isopropyl - pyrazolo-[3:4-d]-pyrimidine of the formula

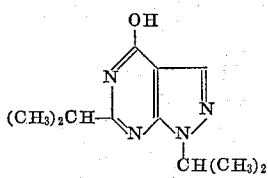

is obtained in white crystals having a melting point of 175–177° C.

*Example 10*

10 grams of 1:6 - diisopropyl - 4 - hydroxy - pyrazolo-[3:4-d]-pyrimidine are added to a sodium ethylate solution prepared from 1.05 grams of sodium and 150 cc. of ethanol. To form the sodium salt, stirring is carried out for 1 hour at room temperature. 6.5 grams of β-diethylaminoethyl-chloride are added, the mixture is heated for 4 hours to boiling point and then evaporated to dryness in vacuo, the residue is dissolved in 100 cc. of 1 N-hydrochloric acid, the pH value adjusted to 10 with sodium hydroxide solution and the precipitated oil is absorbed in ether. The ether residue is distilled. 1:6-diisopropyl - 5 - (β - diethylaminoethyl) - 4 - oxo - 4:5 - dihydro-pyrazolo-[3:4-d]-pyrimidine passes over at 138–140° C. at a pressure of 0.05 mm. Hg.

*Example 11*

5.2 grams of 1 - isopropyl - 4 - hydroxy - 6 - diphenylmethyl-pyrazolo-[3:4-d]-pyrimidine are added to a sodium ethylate solution prepared from 0.35 gram of sodium and 150 cc. of ethanol. To form the sodium salt, stirring is carried out for 1 hour at room temperature. 2.1 grams of β-diethylaminoethyl chloride are added, the mixture is heated for 4 hours to boiling point and evaporated to dryness in vacuo and the residue is crystallized from petroleum ether. In this way, 1-isopropyl-6-diphenylmethyl - 5 - (β - diethylaminoethyl) - 4 - oxo - 4:5-dihydro-pyrazolo-[3:4-d]-pyrimidine is obtained in colorless crystals having a melting point of 124–125° C.

The 1 - isopropyl - 4 - hydroxy - 6 - diphenylmethyl-pyrazolo-[3:4-d]-pyrimidine employed as starting material is obtained as follows:

20 grams of diphenyl acetonitrile and 19.7 grams of 2-isopropyl-3-amino-4-carbethoxy-pyrazole are heated to 70° C. and 2.3 grams of sodium are added in small pieces. The mixture is then heated for 4 hours to 110–120° C. and allowed to cool, the excess sodium is destroyed with ethanol and the mixture is evaporated to dryness in vacuo. 300 cc. of water are added to the residue and the pH value adjusted to 3 with 2 N-hydrochloric acid, whereupon a solid precipitate is deposited. The latter is filtered off with suction, boiled with a large amount of petroleum ether in order to separate any starting material which may still be present and that portion which is not dissolved in petroleum ether is recrystallized from ethanol. In this way, 1-isopropyl-4-hydroxy-6-diphenyl-methyl-pyrazolo-[3:4-d]-pyrimidine of the formula

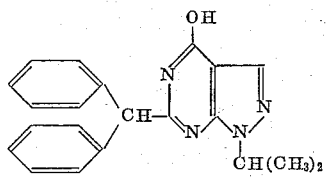

is obtained in white crystals having a melting point of 226–227° C.

*Example 12*

1-sec.-butyl-5-(β-diethylaminoethyl) - 4 - oxo - 4:5 - dihydro-6-benzyl-pyrazolo-[3:4-d]pyrimidine is worked in conventional manner into tablets of the following composition:

| | Mg. |
|---|---|
| 1-sec.-butyl - 5 - (β-diethylaminoethyl)-4-oxo-4:5-dihydro-6-benzyl-pyrazolo-[3:4-d]-pyrimidine | 10 |
| Lactose | 35 |
| Non-swellable starch | 20 |
| Wheat starch | 10 |
| Aerosil | 10 |
| Arrowroot | 12 |
| Magnesium stearate | 0.5 |
| Talc | 6 |

What is claimed is:

1. A member selected from the group consisting of compounds of the formula

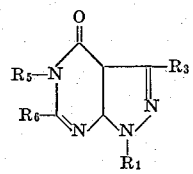

and physiologically tolerable ammonium compounds and salts thereof, in which formula $R_1$ represents a member selected from the group consisting of hydrogen, lower alkyl, hydroxy-lower alkyl, lower alkoxy-lower alkyl, cyclo-lower alkyl, (cyclo-lower alkyl)-lower alkyl, phenyl, lower alkyl-phenyl, hydroxy-phenyl, lower alkoxy-phenyl, amino-phenyl, lower alkylamino-phenyl, di-lower alkylamino-phenyl, lower alkylenedioxy-phenyl, halogenophenyl, trifluoromethyl-phenyl, nitrophenyl, phenyl-lower alkyl, (lower alkyl-phenyl)-lower alkyl, (hydroxy-phenyl)-lower alkyl, (lower alkoxy-phenyl)-lower alkyl, (amino-phenyl)-lower alkyl, (lower alkylamino-phenyl)-lower alkyl, (di-lower alkylamino-phenyl)-lower alkyl, (lower alkylenedioxy-phenyl)-lower alkyl, (halogenophenyl)-lower alkyl, (trifluoromethyl-phenyl)-lower alkyl, nitrophenyl-lower alkyl, pyridyl and pyridyl-lower alkyl, $R_3$ is a member selected from the group consisting of hydrogen and lower alkyl, $R_5$ represents a member selected from the group consisting of di-lower alkylamino-lower alkyl, pyrrolidino-lower alkyl, piperidino-lower alkyl, morpholino-lower alkyl, piperazino-lower alkyl and N-lower alkyl-piperazino-lower alkyl, and $R_6$ represents a member selected from the group consisting of lower alkyl, cyclo-lower alkyl, phenyl-lower alkyl, (lower alkyl-phenyl)-lower alkyl, (hydroxy-phenyl-lower alkyl), (lower alkoxy-phenyl)-lower alkyl, (amino-phenyl)-lower alkyl, (lower alkylamino-phenyl)-lower alkyl, (di-lower alkylamino-phenyl)-lower alkyl, (lower alkylenedioxy-phenyl)-lower alkyl, (halogenophenyl)-lower alkyl, (trifluoromethyl-phenyl)-lower alkyl and nitrophenyl-lower alkyl.

2. A compound of the formula

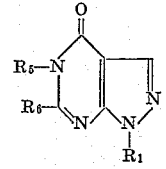

in which $R_1$ stands for lower alkyl, $R_5$ for di-lower alkyl-amino-lower alkyl and $R_6$ represents phenyl-lower alkyl.

3. A compound of the formula

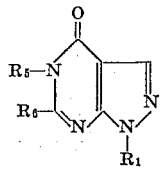

in which $R_1$ stands for lower alkyl, $R_5$ for di-lower alkyl-amino-lower alkyl and $R_6$ represents lower alkyl.

4. A compound of the formula

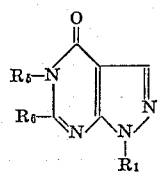

in which $R_1$ stands for phenyl, $R_5$ for di-lower alkyl-amino-lower alkyl and $R_6$ represents phenyl-lower alkyl.

5. A compound of the formula

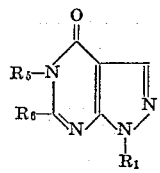

in which $R_1$ stands for lower alkyl, $R_5$ for lower alkyl-amino-lower alkyl and $R_6$ represents phenyl-loweralkyl.

6. 1-secondary-butyl-5-($\beta$-diethylaminoethyl)-6-benzyl-4-oxo-4:5-dihydro-pyrazolo-[3,4-d]-pyrimidine.

7. 1 - isopropyl - 5 - ($\beta$ - dimethylaminoethyl) - 6 - benzyl-4-oxo-4:5-dihydro-pyrazolo-[3,4-d]-pyrimidine.

8. 1 - isopropyl - 5 - ($\beta$ - diethylaminoethyl) - 6 - benzyl-4-oxo-4:5-dihydro-pyrazolo-[3,4-d]-pyrimidine.

9. 1 - isopropyl - 5 - ($\gamma$ - diethylaminopropyl) - 6 - benzyl-4-oxo-4:5-dihydro-pyrazolo-[3,4-d]-pyrimidine.

10. 1 - methyl - 5 - ($\beta$ - diethylaminoethyl) - 6 - benzyl-4-oxo-4:5-dihydro-pyrazolo-[3,4-d]-pyrimidine.

11. 1 - phenyl - 5 - ($\beta$ - diethylaminoethyl) - 6 - benzyl-4-oxo-4:5-dihydro-pyrazolo-[3,4-d]-pyrimidine.

12. 1 - isopropyl - 5 - ($\beta$ - diethylaminoethyl) - 6-methyl-4-oxo-4:5-dihydro-pyrazolo-[3,4-d]-pyrimidine.

13. 1:6 - di - isopropyl - 5 - ($\beta$ - diethylaminoethyl) - 4-oxo-4:5-dihydro-pyrazolo-[3,4-d]-pyrimidine.

14. 1 - isopropyl - 5 - ($\beta$ - diethylaminoethyl) - 6 - (diphenyl - methyl) - 4 - oxo - 4:5-dihydro-pyrazolo-[3,4-d]-pyrimidine.

15. Physiologically tolerable salts with therapeutically acceptable acids of the compounds claimed in claim 2.

16. Physiologically tolerable salts with therapeutically acceptable acids of the compounds claimed in claim 3.

17. Physiologically tolerable salts with therapeutically acceptable acids of the compounds claimed in claim 6.

18. Physiologically tolerable salts with therapeutically acceptable acids of the compounds claimed in claim 4.

References Cited in the file of this patent
FOREIGN PATENTS

| | | |
|---|---|---|
| 835,918 | Great Britain | May 25, 1960 |
| 1,065,421 | Germany | Sept. 17, 1959 |
| 1,172,592 | France | Feb. 12, 1959 |

UNITED STATES PATENT OFFICE
CERTIFICATE OF CORRECTION

Patent No. 3,165,520                       January 12, 1965

Paul Schmidt et al.

It is hereby certified that error appears in the above numbered patent requiring correction and that the said Letters Patent should read as corrected below.

Column 10, lines 30 to 37, the formula should appear as shown below instead of as in the patent:

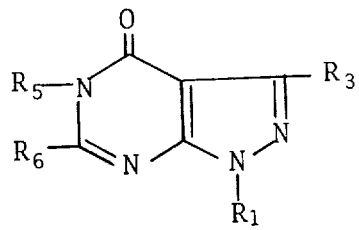

Signed and sealed this 22nd day of June 1965.

(SEAL)
Attest:

ERNEST W. SWIDER
Attesting Officer

EDWARD J. BRENNER
Commissioner of Patents